United States Patent
Niwa et al.

(10) Patent No.: US 8,615,998 B2
(45) Date of Patent: Dec. 31, 2013

(54) LUBRICATION DEVICE OF TURBOCHARGER OF ENGINE FOR VEHICLE

(75) Inventors: Yasushi Niwa, Hiroshima (JP); Kazuaki Nishimura, Hiroshima (JP); Satoshi Nishizaka, Hiroshima (JP); Hiroaki Deguchi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 337 days.

(21) Appl. No.: 13/166,721

(22) Filed: Jun. 22, 2011

(65) Prior Publication Data

US 2012/0003075 A1   Jan. 5, 2012

(30) Foreign Application Priority Data

Jun. 30, 2010   (JP) .................... 2010-149946

(51) Int. Cl.
- *F02B 33/44* (2006.01)
- *F02B 39/00* (2006.01)
- *F02B 39/14* (2006.01)
- *F04B 17/00* (2006.01)
- *F04B 35/00* (2006.01)
- *F01D 25/18* (2006.01)

(52) U.S. Cl.
USPC ........... 60/605.3; 60/612; 417/407; 184/6.11

(58) Field of Classification Search
USPC ........ 60/605.3, 612; 123/562; 184/6.11, 6.18, 184/6.3; 417/407
See application file for complete search history.

(56) References Cited

U.S. PATENT DOCUMENTS

| | | | | |
|---|---|---|---|---|
| 3,057,436 A * | 10/1962 | Jacobson et al. | ............. | 60/605.3 |
| 3,200,580 A * | 8/1965 | Millar | ............. | 60/605.3 |
| 3,203,514 A * | 8/1965 | Davies et al. | ............. | 188/170 |
| 4,058,981 A * | 11/1977 | Henson | ............. | 60/605.3 |
| 4,126,997 A * | 11/1978 | Henson | ............. | 184/6.3 |
| 4,608,827 A * | 9/1986 | Hasegawa et al. | ............. | 60/605.1 |
| 4,928,637 A * | 5/1990 | Naitoh et al. | ............. | 60/605.3 |
| 5,156,000 A * | 10/1992 | Mallofre | ............. | 60/612 |
| 5,692,378 A * | 12/1997 | Ramsden | ............. | 60/612 |
| 6,213,062 B1 * | 4/2001 | Kawase | ............. | 123/41.31 |
| 6,782,849 B2 * | 8/2004 | Roithinger | ............. | 123/41.56 |
| 2011/0277731 A1 * | 11/2011 | Kajita | ............. | 123/456 |
| 2012/0000196 A1 * | 1/2012 | Niwa et al. | ............. | 60/602 |
| 2012/0003082 A1 * | 1/2012 | Niwa et al. | ............. | 415/180 |
| 2012/0037121 A1 * | 2/2012 | Kajita et al. | ............. | 123/445 |

FOREIGN PATENT DOCUMENTS

| | | | | |
|---|---|---|---|---|
| DE | 3504374 A1 | * | 8/1986 | |
| FR | 2969695 A1 | * | 6/2012 | |
| JP | 59145331 A | * | 8/1984 | |
| JP | 02173323 A | * | 7/1990 | |

(Continued)

*Primary Examiner* — Thai Ba Trieu

(74) *Attorney, Agent, or Firm* — Studebaker & Brackett PC

(57) ABSTRACT

A first turbocharger comprises a first center housing and a first return passage. A second turbocharger comprises a second center housing and a second return passage. The first return passage joins the second return passage at a junction. The length of the second return passage from the second center housing to the junction is longer than that of the first return passage from the first center housing to the junction. A bellows-shaped vibration absorption portion is provided at the second return passage. The first return passage comprises a first upstream return passage and a first downstream return passage, and the first upstream and downstream return passages are connected to each other via the flexible hose.

10 Claims, 15 Drawing Sheets

(56) References Cited

FOREIGN PATENT DOCUMENTS

| | | | | |
|---|---|---|---|---|
| JP | 2003056355 | A | * | 2/2003 |
| JP | 2006-070878 | A | | 3/2006 |
| JP | 2007-309124 | A | | 11/2007 |
| JP | 2009221911 | A | * | 10/2009 |
| JP | 2009228561 | A | * | 10/2009 |

* cited by examiner

|  | Start (M0) | Low (M1) | Middle (M2) | M. High (M3) | High (M4) |
|---|---|---|---|---|---|
| Reg. V. | Open | Close | Adjust | Open | Open |
| Intake Cut V. | Close | Close | Close | Open | Open |
| Waste Gate V. | Open | Close | Close | Close | Adjust |

LUBRICATION DEVICE OF TURBOCHARGER OF ENGINE FOR VEHICLE

BACKGROUND OF THE INVENTION

The present invention relates to a lubrication device of a turbocharger of an engine for a vehicle, and in particular relates to the one in which a first turbocharger and a second turbocharger are provided at a one-side wall of the engine, the second turbocharger being located above the level of the first turbocharger.

Conventionally, a turbo charging device to supercharge intake air by using the kinetic energy of exhaust gas exhausted from an engine is known. Further, a sequential type of turbo charging device, in which there are provided a small-sized turbocharger to supercharge the intake air mainly at a low engine-speed and low load and a large-sized turbocharger to supercharge the intake air mainly at a high engine-speed and high engine-load, and supercharging characteristics of the turbochargers are selectable in accordance with an engine's operation state, is known.

In the turbo charging device disclosed in U.S. Pat. No. 6,782,849, the large-volume first turbocharger and the small-volume second turbocharger are provided at the one-side wall of the engine, the second turbocharger being located above the level of the first turbocharger, the compressor of the second turbocharger being arranged downstream of the compressor of the first turbocharger, and the intercooler is arranged upstream of the coolant's cooler and between the compressor of the first turbocharger and the compressor of the second turbocharger. According to this device, the length of the intake-air pipe between the intercooler and the compressor of the second turbocharger can be shorter, so that the layout space can be improved.

In the turbo charging device disclosed in Japanese Patent Laid-Open Publication No. 2006-70878, the small-sized turbocharger, the large-sized turbocharger, the DPF (Diesel Particulate Filter) connected to the turbine outlet of the large-sized turbocharger are provided at the one-side wall of the engine, the large-sized turbocharger being arranged below the small-sized turbocharger, the DPF being located below the small-sized turbocharger and substantially at the level of the large-sized turbocharger so that the exhaust-gas induction port thereof opens on the side of the turbine of the large-sized turbocharger. According to this device, the DPF and turbochargers can be provided compactly on the one-side wall of the engine, and the exhaust gas with less exhaust-energy loss and higher temperature can be obtained.

The turbine shaft of the turbo charging device is rotatably supported at the oil-lubrication type of the shaft bearing portion in the center housing. Herein, the turbine driven by the exhaust-gas kinetic energy rotates at a high engine-speed exceeding 200,000 rpm, so it is essential to improve the function of the lubrication device which lubricates the shaft bearing portion in order to secure the reliability of the turbo charging device.

In the turbo charging device disclosed in Japanese Patent Laid-Open Publication No. 2007-309124, there are provided the turbocharger, the center housing as the shaft bearing portion to support the turbine shaft, the oil supply passage to connect the cylinder block and the center housing, the metal-made oil return passage to connect the lower face of the center housing and the lower end portion of the cylinder block, the exhaust manifold and three-way catalyst and the like which are arranged in the upper-and-rear side space. The heat-insulating plate is attached to the oil return passage so as to divide the space into the upper-and-rear side space and the lower-and-front side space. According to this device, the heat influence of the heat-insulating plate for the lower-and-front side space is prevented, so that any heat-sensitive member, such as rubber pipe or a synthetic-resin made component, can be attached. Herein, this patent publication discloses, in the column of background art, the rubber-made oil return passage which is covered with the heat insulating plate at part of its surface to improve against the vibration move of the turbocharger relative to engine.

According to the turbo charging device disclosed in the above-described third patent publication, since the oil return passage is made from metal, it may be possible to arrange the heat-sensitive components without causing any heat damage to the oil return passage disposed in the vicinity of a heat source, such as the exhaust manifold or the three-way catalyst. However, in the case of the two turbochargers being provided at the side wall of the engine as disclosed in the above-described first and second patent publications, the following problems may occur newly.

First, since the two turbochargers are provided at the side wall of the engine, each of the turbochargers requires the housing, oil passage for supply and return, cooling water passage for supply and return, and others, in addition to the passage for exhaust gas connecting the turbochargers, so that the layout of components around the engine may become difficult. Therefore, there is a concern that arrangement of components, such as engine supplemental parts or engine-side connection portions of the oil return passages and the like, may become difficult.

Secondly, each turbocharger has its assembly error and vibration move relative to the engine's side wall. Therefore, when the intake and exhaust passages of the turbo chargers are connected, the assembly error of one of the turbochargers relative to the engine-side connection portion may influence the assembly error of the oil return passage of the other turbocharger relative to the engine-side connection portion. Accordingly, there is a concern that the assembly error of the two turbochargers may increase compared to the case of assembling a single turbocharger. Further, in the case of the two turbochargers being assembled, the layout space becomes narrower and the heat-source number increases, so that the rubber-made oil return passage may also have its heat damage as well.

SUMMARY OF THE INVENTION

An object of the present invention is to provide a lubrication device of a turbocharger of an engine for a vehicle which can increase the layout flexibility around the engine, absorb the vibration move of the first and second turbochargers relative to the engine, absorb the positional error between the first and second turbochargers, and the like.

According to the present invention, there is provided a lubrication device of a turbocharger of an engine for a vehicle, in which a first turbocharger and a second turbocharger are provided at a one-side wall of the engine, the second turbocharger being located above the level of the first turbocharger, wherein the first turbocharger comprises a shaft bearing portion to which lubricating oil is supplied from the engine and a metal-made return passage through which the lubricating oil from the shaft bearing portion is returned to an return portion of the engine, the second turbocharger comprises a shaft bearing portion to which lubricating oil is supplied from the engine and a metal-made return passage through which the lubricating oil from the shaft bearing portion is returned to the return portion of the engine, the return passage of the first turbocharger joins the return passage of the second turbocharger at a junction, the length of the return passage of the second turbocharger from the shaft bearing portion to the junction is longer than that of the return passage of the first turbocharger from the shaft bearing portion to the junction, a bellows-shaped vibration absorption portion is provided at the return passage of the second turbocharger, and the return passage of the first turbocharger comprises an upstream return passage and a downstream return passage, and the upstream and downstream return passages are connected to each other via a flexible hose.

According to the present invention, since the metal-made return passages of the first and second turbochargers are provided described above, the number of the return portion as the engine-side connection portion can be less than that of the return passages of the first and second turbochargers. Thereby, the return passages of the first and second turbochargers can be connected to the engine compactly by using a smaller layout space. Further, since only the one of the return passages is connected to the engine, the positional error of the other turbocharger relative to the engine does not influence this return passage, so that the assembly error of this return passage can be minimized Further, eve if the return passage of the second turbocharger is made from metal having a high heat resistance, the vibration move between the second turbocharger and the engine can be properly absorbed by the bellows-shaped vibration absorption portion. Moreover, since the flexible hose of the return passage of the first turbocharger can be shorter, the surface area exposed to the high temperature can be minimized Accordingly, the vibration move between the first turbocharger and the engine can be absorbed, preventing the heat damage of the flexible hose, so that the positional error between the first and second turbochargers can be absorbed properly.

According to an embodiment of the present invention, a turbine shaft of the first turbocharger and a turbine shaft of the second turbocharger are arranged substantially in parallel to each other, an exhaust-gas purification device is arranged on the side of one end of the turbine shaft, both the return passages of the first and second turbochargers are arranged on the side of the other end of the turbine shaft relative to the exhaust-gas purification device in an axial direction of the turbine shaft, and the return passage of the first turbocharger is arranged on the side of the other end of the turbine shaft relative to the return passage of the second turbocharger in the axial direction of the turbine shaft. Thereby, since the metal-made return passage of the second turbocharger is provided between the exhaust-gas purification device and the flexible hose and the distance between the exhaust-gas purification device and the flexible hose can be greater, the heat damage of the flexible hose by the exhaust-gas purification device can be restrained, so that the appropriate oil return of the first and second turbochargers can be secured.

According to another embodiment of the present invention, the exhaust-gas purification device is a diesel particulate filter. Thereby, even if the DPF (Diesel Particulate Filter) which tends to generate heat greatly is provided, the heat damage of the flexible hose can be restrained, so that the appropriate oil return of the first and second turbochargers can be secured.

According to another embodiment of the present invention, the first turbocharger is a turbocharger to operate at a low engine-speed, and the second turbocharger is a turbocharger which operates at a middle and high engine-speed. Thereby, the vibration move of the second turbocharger having the higher turbine speed can be absorbed by the long metal-made return passage of the second turbocharger which is equipped with the bellows-shaped vibration absorption portion, so that the reliability of the return passage of the second turbocharger can be secured.

According to another embodiment of the present invention, the lubricating oil supplied from the engine is supplied to an oil distributer from an oil gallery of a cylinder head, and then to the shaft bearing portions of the first and second turbochargers. Thereby, since the number of an oil take-out portion as the engine-side connection portion can be less than that of supply passages of the first and second turbochargers, the supply passages of the first and second turbochargers can be connected to the engine side wall compactly by using a smaller layout space, so that the layout flexibility around the engine can be increased.

Other features, aspects, and advantages of the present invention will become apparent from the following description which refers to the accompanying drawings.

DETAILED DESCRIPTION OF THE INVENTION

Hereafter, a preferred embodiment of the present invention will be descried. In the embodiment the direction is described so that the "front" or "rear" means the vehicle front or the vehicle rear and the "right" or "left" means the right or left when viewed from the vehicle rear.

Figure 1:
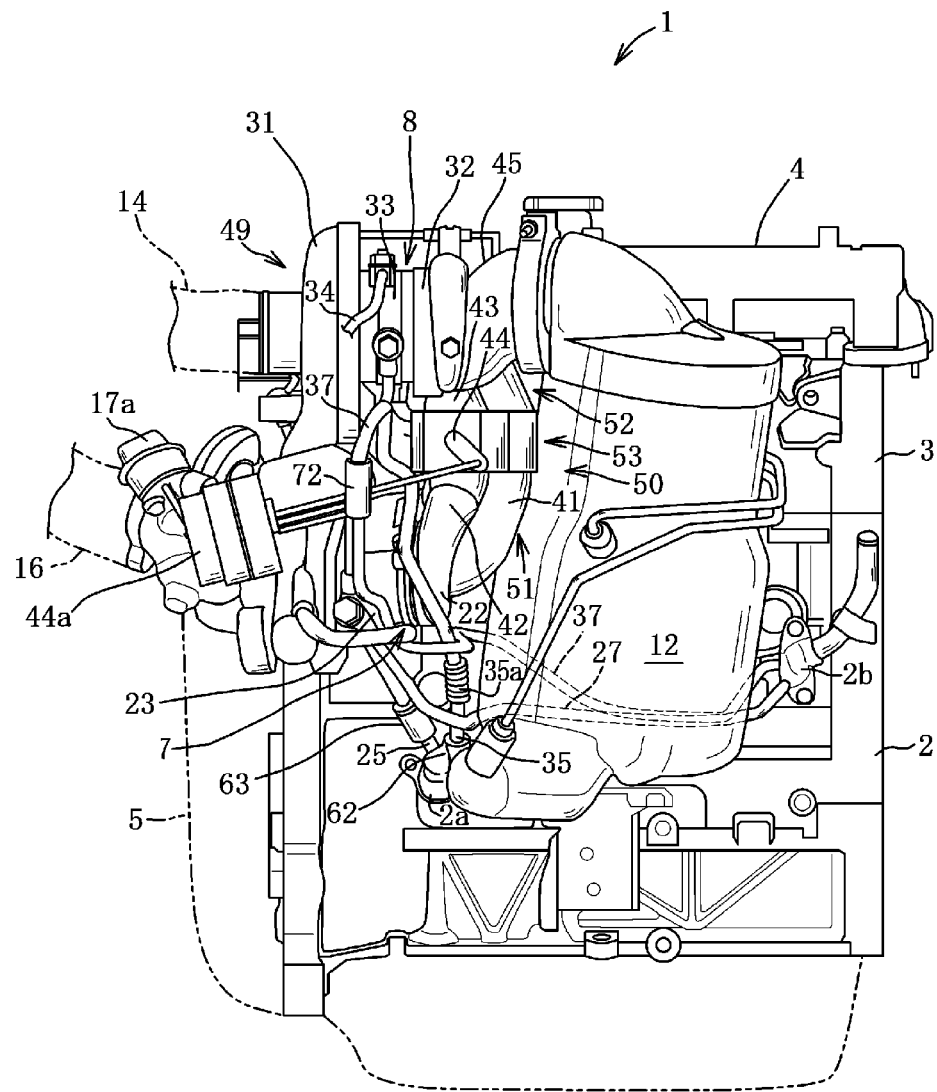
FIG. 1 is a rear view of a turbo charging device of an engine for a vehicle according to the present invention, when viewed from a vehicle rear.
Figure 2:
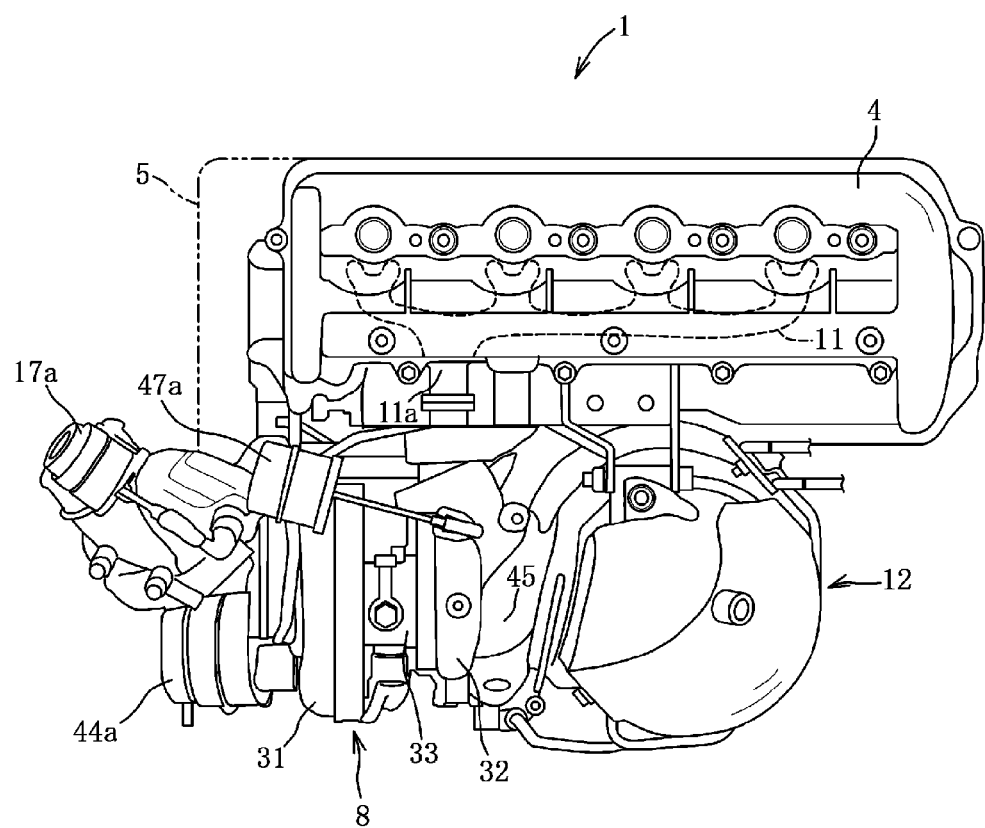
FIG. 2 is a plan view of the engine, when viewed from above.
Figure 3:
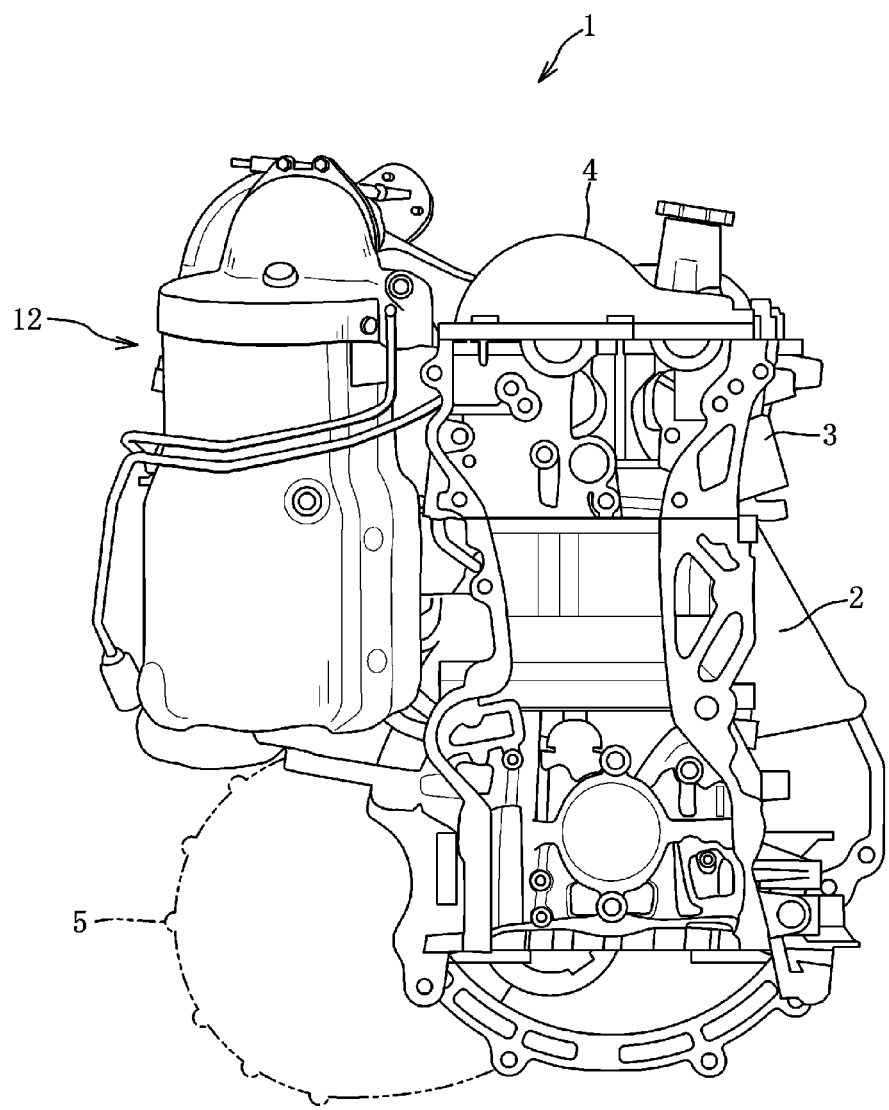
FIG. 3 is a right side view of the engine.

The present embodiment of the present invention will be described referring to FIGS. 1 through 18. As shown in FIGS. 1 through 3, an inline 4-cylinder diesel engine 1 comprises a cylinder block 2, a cylinder head 3 which is arranged above the cylinder block 2, a cylinder head cover 4 which covers over the cylinder head, a transmission unit 5 which is arranged at a left-side end portion of the cylinder block 2, and so on.

The engine 1 is disposed laterally so that the direction of its crankshaft (not illustrated) matches the direction of a vehicle axle, and intake ports 3a are positioned on the vehicle front side and exhaust ports 3b are positioned on the vehicle rear side. The engine 1 is configured so that its compression ratio in the compression stroke is controlled at around 14, for example, which may be smaller than that of a normal diesel engine. The transmission unit 5 includes a transfer case (not illustrated) covering the unit, which projects rearward from the rear side wall of the engine 1.

As shown in FIGS. 1 through 3 and 9, an intake system of the engine 1 comprises an air cleaner 6 which removes (traps) dusts and the like in the intake air, a first turbocharger compressor 7a of a small-volume first turbocharger 7 which supercharges the intake air mainly at a low engine-speed, a second turbocharger compressor 8a of a large-volume second turbocharger 8 which supercharges the intake air mainly at a middle and high engine-speed, an intercooler 9 which cools the intake air heated through pressing, an intake manifold 10 which guides the intake air to the intake ports 3a of the engine, and so on.

Figure 4:
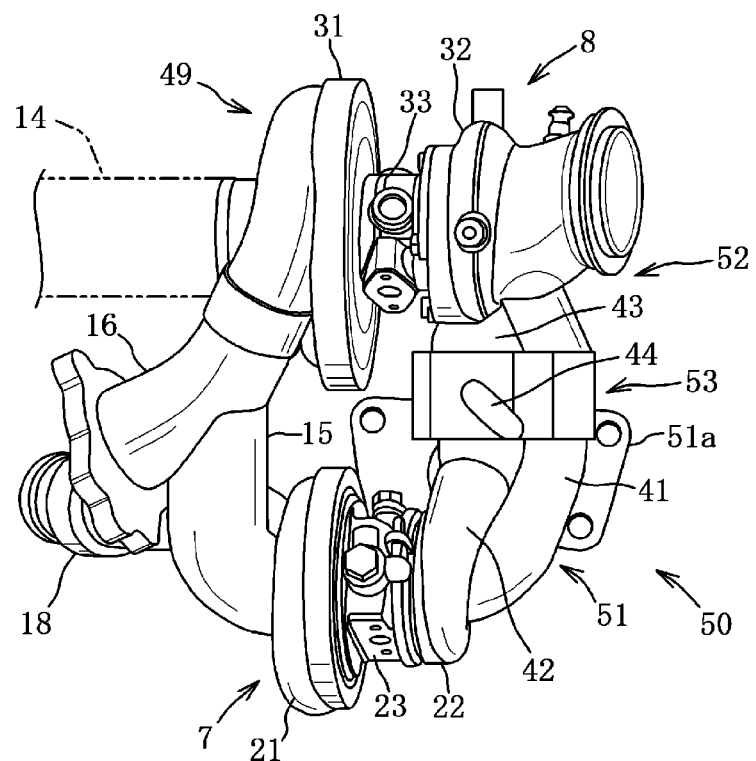
FIG. 4 is a rear view of an intake passage unit and an exhaust passage unit, when viewed from the vehicle rear.
Figure 9:
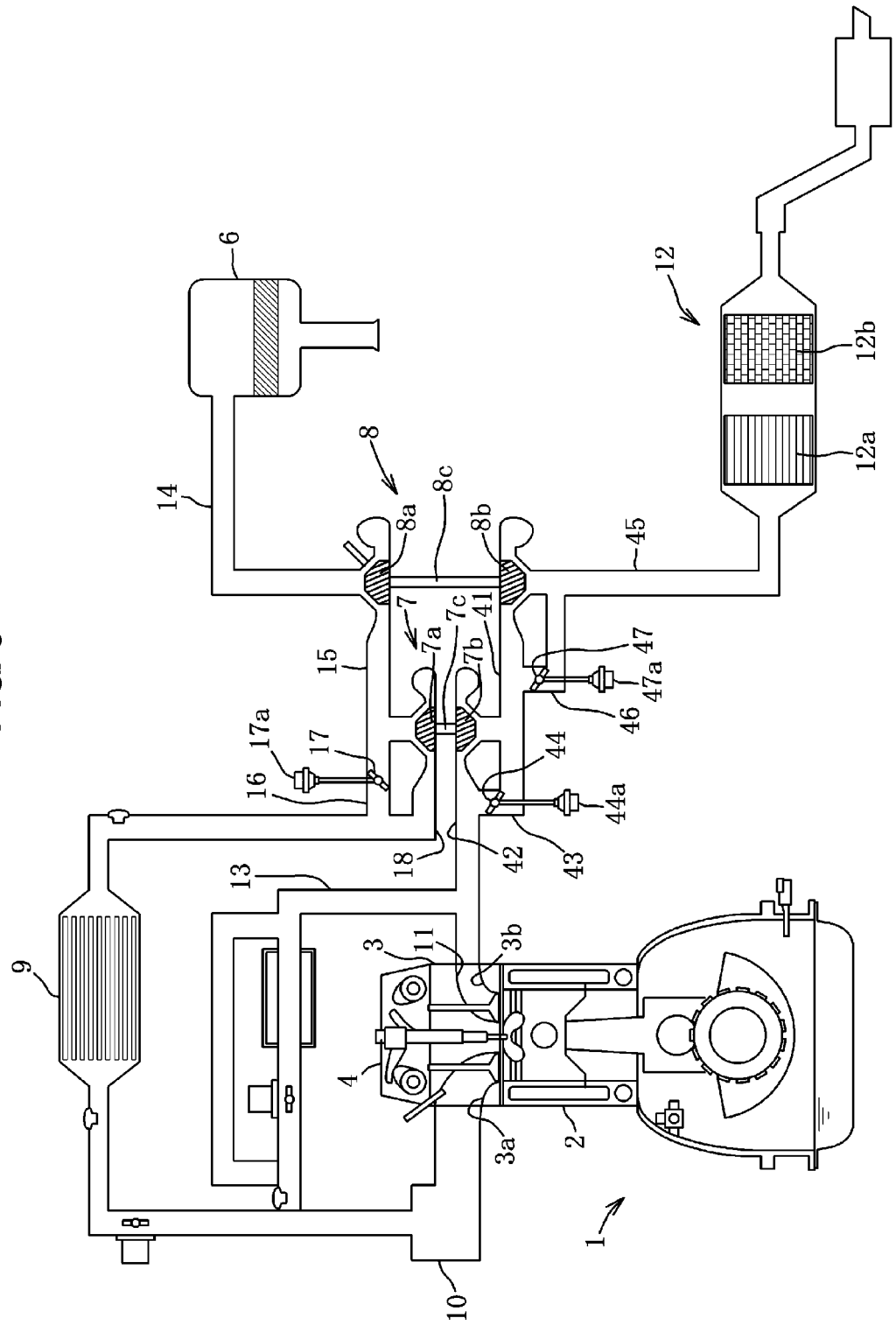
FIG. 9 is a diagram schematically showing intake and exhaust flows.

As shown in FIGS. 4 and 9, the first turbocharger 7 comprises the first turbocharger compressor 7a, a first turbocharger turbine 7b, a first turbocharger turbine shaft 7c which synchronously-rotatably connects the first turbocharger compressor 7a and the first turbocharger turbine 7b, a first compressor housing 21 which covers an outer periphery of the first turbocharger compressor 7a, a first turbine housing 22 which covers an outer periphery of the first turbocharger turbine 7b, a first center housing 23 (shaft bearing portion) which rotatably supports the first turbocharger turbine shaft 7a and covers an outer periphery of the first turbocharger turbine shaft 7c, and so on. The first center housing 23 integrally connects the first compressor housing 21 and the first turbine housing 22. As shown in FIG. 1, the first turbocharger 7 is provided on the rear side of the engine 1 so that the first turbocharger turbine shaft 7c is substantially in parallel to the crankshaft of the engine 1.

The second turbocharger 8 comprises a second turbocharger compressor 8a, a second turbocharger turbine 8b, a second turbocharger turbine shaft 8c which synchronously-rotatably connects the second turbocharger compressor 8a and the second turbocharger turbine 8b, a second compressor housing 31 which covers an outer periphery of the second turbocharger compressor 8a, a second turbine housing 32 which covers an outer periphery of the second turbocharger turbine 8b, a second center housing 33 (shaft bearing portion) which rotatably supports the second turbocharger turbine shaft 8a and covers an outer periphery of the second turbocharger turbine shaft 8c, and so on. The second center housing 33 integrally connects the second compressor housing 31 and the second turbine housing 32. As shown in FIG. 1, the second turbocharger 8 is provided above the first turbocharger 7 and on the rear side of the engine 1 so that the second turbocharger turbine shaft 8c is substantially in parallel to the crankshaft of the engine 1.

As shown in FIGS. 4 and 9, an intake flow passage 14 which extends from the air cleaner 6 is connected to an outlet portion of the second turbocharger compressor 8a. An outlet portion of the second turbocharger compressor 8a and an inlet portion of the first turbocharger compressor 7a are connected via a compressor connection passage 15. An intake supply passage 16 to supply the intake air to the intake manifold 10 branches from a midway of the compressor connection passage 15 via the intercooler 9. An intake cut valve 17 is arranged inside the intake supply passage 16. The intake cut valve 17 is comprised of a swing valve, which is driven by an actuator 17a. A compressor downstream passage 18 is connected to the outlet portion of the first turbocharger compressor 7a. The compressor downstream passage 18 is connected to the intake supply passage 16 at a position downstream of the intake cut valve 17.

As shown in FIG. 4, an intake passage unit 49 is comprised of the first compressor housing 21, the second compressor housing 31, the compressor connection passage 15, part of the intake supply passage 16, and part of the compressor downstream passage 18. The intake passage unit 49 is made from metal, such as aluminum alloy, through casting. Herein, any thermal treatment after the casting may be omitted at need.

As shown in FIGS. 1 through 3 and 9, the exhaust system of the engine 1 comprises an exhaust manifold 11 which receives the exhaust gas from the exhaust ports 3b, the first turbocharger turbine 7b of the first turbocharger 7 driven by the exhaust energy, the second turbocharger turbine 8b of the second turbocharger 8 driven by the exhaust energy, an exhaust-gas purification device 12, an EGR pipe 13 to recirculate part of the exhaust gas into the intake manifold 10, and so on. The exhaust manifold 11 is configured to collect the exhaust ports 3b inside the cylinder head 3, and a flange 11a to connect the first turbocharger 7 is formed at a downstream end of the exhaust manifold 11.

The first turbocharger 7 and the second turbocharger 8 are arranged vertically so that the flange 11a is disposed between the engine 1 and these turbochargers 7, 8, and the outlet portion of the first turbocharger turbine 7b and the outlet portion of the second turbocharger turbine 8b are arranged on the right side in the direction of the crankshaft of the engine 1. The first turbocharger 7 is arranged on the left side of an upper portion of the cylinder block 2 and below the flange 11a. The second turbocharger 8 is arranged on the left side of the cylinder head cover 4 and above the flange 11a. The first turbocharger 7 and the second turbocharger 8 are fixed via bolts to an attachment portion 3g projecting from a rear side wall of the cylinder head 3 (see FIGS. 13, 15 and 16).

As shown in FIGS. 4 and 9, in the exhaust system of the engine 1 are provided a connection passage 41 which connects the outlet portion of the first turbocharger turbine 7b and the inlet portion of the second turbocharger turbine 8b, an induction passage 42 which guides the exhaust gas through the flange 11a of the exhaust manifold 11 to the inlet portion of the first turbocharger turbine 7b, a first bypass passage 43 which connects the induction passage 42 and the connection passage 41, a regulating valve 44 (control valve) which opens or closes the first bypass passage 43, and so on. The regulating valve 44 is comprised of a butterfly valve and driven by an actuator 44a.

Figure 5:
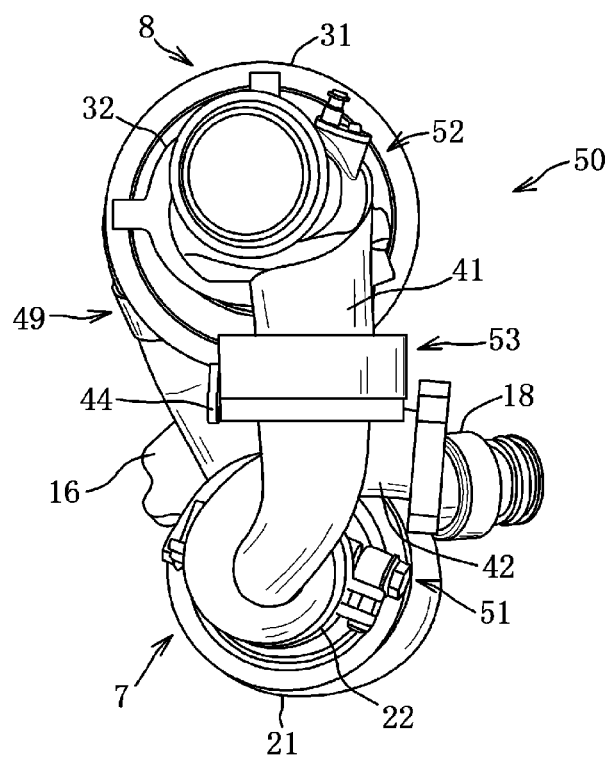
FIG. 5 is a side view of the intake passage unit and the exhaust passage unit, when viewed from a vehicle right.
Figure 6:
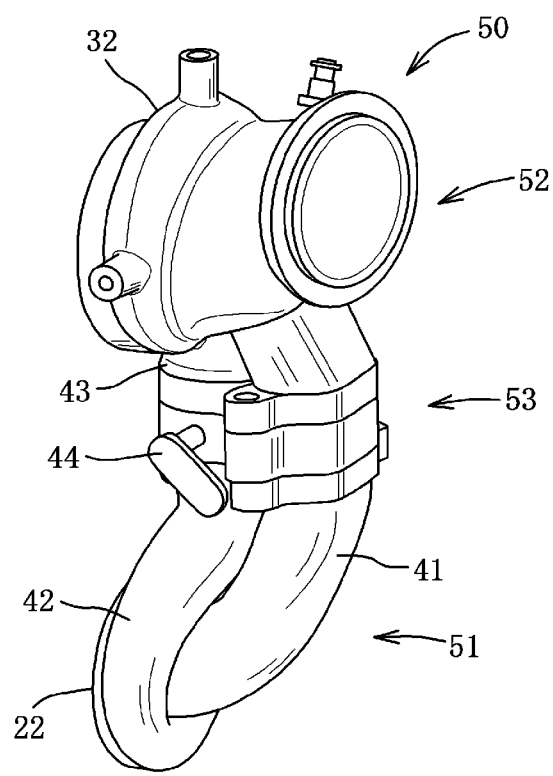
FIG. 6 is a perspective view of the exhaust passage unit.

As shown in FIGS. 5 and 6, the connection passage 41 extends almost straight from the outlet portion (axial-center position) of the first turbocharger turbine 7b toward the second turbocharger 8 (upward) in the axial direction of the turbine shafts 7c, 8c, and then connects to an outer peripheral portion of the second turbocharger turbine 8b in a tangential direction. Thereby, the outlet portion of the first turbocharger turbine 7b and the inlet portion of the second turbocharger turbine 8b can be connected via the shorter passage, so that the passage resistance of the exhaust gas can be decreased and also the radiation of the heat energy of the exhaust gas can be restrained properly.

Figure 7:
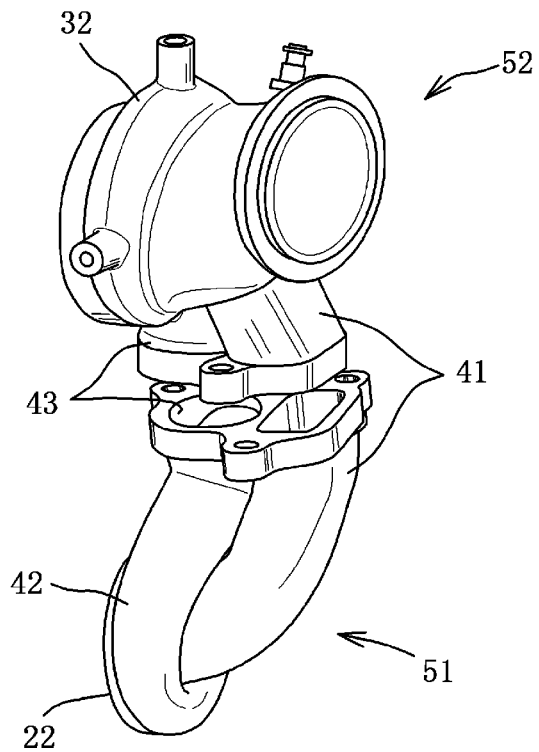
FIG. 7 is a perspective view of a first unit portion and a second unit portion.
Figure 8:
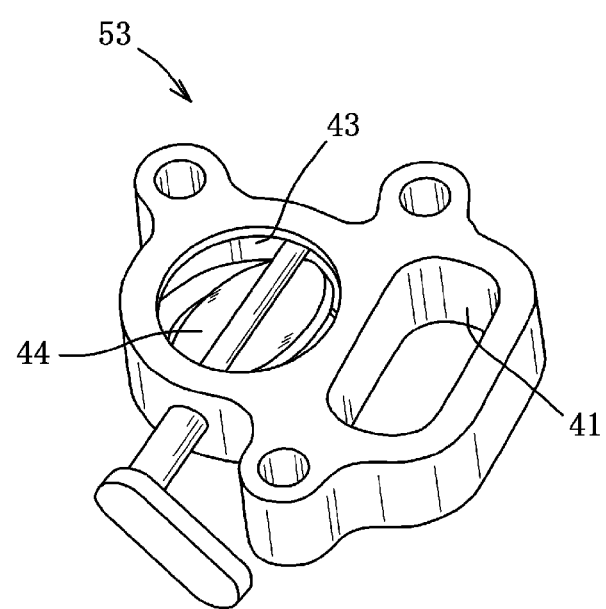
FIG. 8 is a perspective view of a middle member.

As shown in FIGS. 4 and 6, the connection passage 41 and the first bypass passage 43 are arranged nearby and integrally along the axial direction of the turbine shafts 7c, 8c. As shown in FIGS. 7 and 8, the section of part of the connection passage 41 on the side of the second turbocharger turbine 8 is of a flat shape, and the long axis of this section is substantially perpendicular to the second turbocharger turbine shaft 8c. The sectional shape of the connection passage 41 is configured so that the short axis of part of that located near the inlet portion of the second turbocharger turbine 8b is shorter than that of part of that located near the outlet port of the first turbocharger turbine 7b, whereas the long axis of part of that located near the inlet portion of the second turbocharger turbine 8b is longer than that of part of that located near the outlet port of the first turbocharger turbine 7b. Accordingly, the passage resistance of the exhaust gas can be decreased, so that the exhaust gas can be supplied to the second turbocharger turbine 8b without reducing the kinetic energy of the exhaust gas. The first bypass passage 43 is substantially of a circular shape.

As shown in FIGS. 4 through 6, an exhaust passage unit 50 is comprised of the first turbine housing 22, the second turbine housing 32, the connection passage 41, the first bypass passage 43, and the induction passage 42 of the first turbocharger turbine 23. The exhaust passage unit 50 includes a first unit portion 51 on the side of the first turbocharger 7, a second unit portion 52 on the side of the second turbocharger 8, and a middle member 53 provided at a connection portion of the first unit portion 51 to the second unit portion 52. The exhaust passage unit 50 is made from metal having a high heat and oxidation resistance, such as Si—Mo—Cr based Fe, through casting.

As shown in FIGS. 4 through 7, at the first unit portion 51 are integrally formed the first turbine housing 22, part of the connection passage 41 to supply the exhaust gas from the engine 1 to the second turbocharger turbine 8b via the first turbocharger turbine 7b, the induction passage 42 to supply the exhaust gas from the engine 1 to the first turbocharger turbine 7b, and part of the first bypass passage 43 to supply the exhaust gas from the engine 1 to the second turbocharger turbine 8b. As shown in FIG. 4, a flange portion 51a which is equipped with four bolt holes is formed at the front side of the first unit portion 51, and the intake passage unit 49 and the exhaust passage unit 50 are attached to the attachment portion 3g of the cylinder head 3 via this flange portion 51a with bolts.

At the second unit portion 52 are integrally formed the second turbine housing 32, part of the connection passage 41 to supply the exhaust gas from the engine 1 to the second turbocharger turbine 8b via the first turbocharger turbine 7b, and part of the first bypass passage 43 to supply the exhaust gas from the engine 1 to the second turbocharger turbine 8b.

As shown in FIG. 8, the regulating valve 44 is rotatably supported at the middle member 53 provided at the connection portion of the first and second unit portions 51, 52, and the part of the first bypass passage 43 and the part of the connection passage 41 are formed. Three bolt holes are formed respectively at an outer peripheral portion of the middle member 53, the first unit portion 51, and the second unit portion 52. These members 51, 52, 53 are fixed together by fastening three bolts passing into three bolt holes, thereby constituting the exhaust passage unit 50. At part of an inner peripheral portion of the first bypass passage 43 is formed a seat portion for the regulating valve 44. The regulating valve 44 is adjustable linearly from its full closing state to a specified opening angle, e.g., 80 degrees, so that the flow amount of exhaust gas passing through the first bypass passage 43 can be adjusted properly by the actuator 44a.

As shown in FIGS. 1 through 3 and 9, a turbine downstream passage 45 extends to the right from the outlet portion of the second turbocharger turbine 8b and connects to the exhaust-gas purification device 12. Between the inlet portion of the second turbocharger turbine 8b and the turbine downstream passage 45 is formed a second bypass passage 46. A waste gate valve 47 is arranged inside the second bypass passage 46. This waste gate valve 47 is comprised of a swing valve and driven by an actuator 47a.

The exhaust-gas purification device 12 is positioned vertically on the right of the rear side wall of the engine 1, i.e., the first turbocharger 7 and the second turbocharger 8, so that its inlet is located substantially at the level of the outlet portion of the second turbocharger turbine 8b, whereas its outlet is located below the first turbocharger 7. The exhaust-gas purification device 12 stores an oxidizing catalyst 12a and the DPF (Diesel Particulate Filter) 12b therein, and has an insulator covering it. The exhaust-gas purification device 12 is supported respectively at an upper bracket 19 which is fixed to the cylinder head cover 4 via its upper end portion and at a lower bracket 20 which is fixed to the cylinder block 2 via its lower end portion. Herein, the DPF 12b may be comprised of not only a filter to trap (remove) soot, but a filter with catalytic agent.

Figures 10, 11:
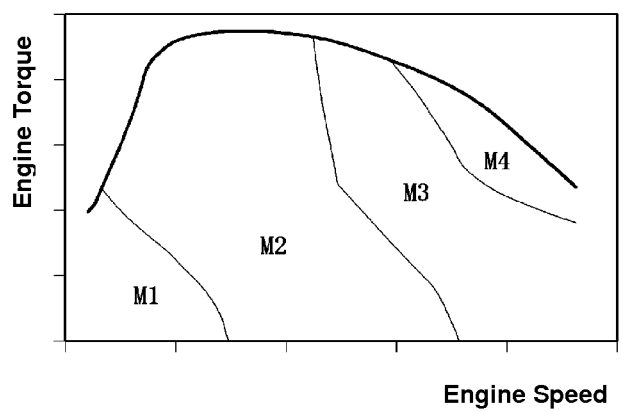
FIG. 10 is a control map for selection of driving modes.
FIG. 11 is a chart showing opening or closing states of valves in respective driving modes.

The control of the first and second turbochargers 7, 8 will be described referring to FIGS. 9 through 11. As shown by a control map in FIG. 10, the engine 1 is controlled in accordance with vehicle traveling state with five driving modes M0-M4; the start mode MO, the low engine-speed mode M1, the middle engine-speed mode M2, the middle high engine-speed mode M3 and the high engine-speed mode M4. A control part (not illustrated) of the engine 1 determines the driving modes M0-M4 based on detection values of some onboard sensors, and controls the intake cut valve 17, the regulating valve 44, and the waste gate valve 47 based on the chart shown in FIG. 11.

In the start mode M0 at the engine start, the intake cut valve 17 is closed, and the regulating valve 44 and the waste gate valve 47 are open. As shown in FIG. 9, the exhaust gas of the engine 1 flows down through the exhaust ports 3b and the exhaust manifold 11, then into the induction passage 42. Herein, since the regulating valve 44 is open, the exhaust gas flows down through the first bypass passage 43, bypassing the first turbocharger turbine 7b. Then, the exhaust gas flows into the exhaust-gas purification device 12, bypassing the second turbocharger turbine 8b, because the waste gate valve 47 is open. Accordingly, the exhaust gas having the less kinetic-energy loss and the high temperature can be guided into the exhaust-gas purification device 12. Herein, since the first turbocharger compressor 7a and the second turbocharger compressor 8a do not operate, the intake air is not supercharged.

In the low engine-speed mode M1, the intake cut valve 17, the regulating valve 44 and the waste gate valve 47 are closed. Since the regulating valve 44 is closed, the exhaust gas of the engine 1 drives the first turbocharger turbine 7b and the second turbocharger turbine 8b and then flows into the exhaust-gas purification device 12. The intake air supercharged by the first turbocharger compressor 7a and the second turbocharger compressor 7b is supplied to the intake ports 3a. Accordingly, the supercharging effect can be properly obtained even with the kinetic energy of the exhaust gas which may be relatively small at the low engine-speed.

In the middle engine-speed mode M2, the intake cut valve 17 and the waste gate valve 47 are closed, and the regulating valve 44 is adjusted. The opening of the regulating valve 44 is adjusted so as to become larger when the engine speed is higher or the engine torque is greater. Since the opening angle of the regulating valve 44 is controlled in according with the driving state, part of the exhaust gas drives the first turbocharger turbine 7b and the second turbocharger turbine 8b, and the rest of the exhaust gas flows into the exhaust-gas purification device 12, bypassing the first turbocharger turbine 7b and the second turbocharger turbine 8b. The intake air supercharged by the first turbocharger compressor 7a and the second turbocharger compressor 7b is supplied to the intake ports 3a. Accordingly, both the supercharging efficiency of the first turbocharger compressor 7a and the decrease of exhaust resistance can be improved.

In the middle high engine-speed mode M3, the intake cut valve 17 and the regulating valve 44 are open, and the waste gate valve 47 is closed. The exhaust gas of the engine 1 bypasses the first turbocharger turbine 7b, passes through the first bypass passage 43 and drives the second turbocharger turbine 8b, then flows into the exhaust-gas purification device 12. The intake air supercharged by the second turbocharger compressor 8a is supplied to the intake ports 3a.

In the high engine-speed mode M4, the intake cut valve 17 and the regulating valve 44 are open, and the waste gate valve 47 is adjusted. The waste gate valve 47 is controlled to be open when the engine speed is a specified speed or higher and the engine torque is a specified torque or greater. Since the waste gate valve 47 is adjusted in accordance with the driving state, part of the exhaust gas bypassing the first turbocharger turbine 7b drives the second turbocharger turbine 8b, and the rest of the exhaust gas flows into the exhaust-gas purification device 12, bypassing the second turbocharger turbine 8b. The intake air supercharged by the second turbocharger compressor 8b is supplied to the intake ports 3a. Accordingly, the proper supercharging efficiency of the second turbocharger compressor 8a can be secured, and the intake and exhaust resistance can be decreased properly.

Hereafter, the lubrication device of the present embodiment will be described referring to FIGS. 1, 12 through 14. As shown in FIG. 13, an oil gallery 3c extending laterally is formed inside the cylinder head 3. The lubricating oil of the engine 1 is supplied by an oil pump (not illustrated) provided at the cylinder block 2 to respective lubrication portions via oil passages. The lubricating oil which is supplied from the oil pump to the cylinder head 3 is supplied to respective bearing portions for camshafts from the oil gallery.

Inside a first center housing 23 of the first turbocharger 7 is formed an oil reservoir (not illustrated) to reserve the lubricating oil between a first turbocharger turbine shaft 7c and the bearing portions. Similarly to the first center housing 23, another oil reservoir (not illustrated) to reserve the lubricating oil between a second turbocharger turbine shaft 8c and the bearing portions is formed inside a second center housing 33 of the second turbocharger 8. The lubricating oil for the first and second turbocharger turbine shaft is supplied to the first and second center housings 23, 33 from the cylinder head 3 via an oil distributor 60. Then, the lubricating oil is returned to an oil return portion 2a which is formed at a middle left position of a rear side wall of the cylinder block 2.

The oil distributor 60 is located at a left position of a rear upper and left end portion of the cylinder block 2. The oil distributor 60 is connected by an oil take-out portion 3d connecting to a left end portion of the oil gallery 3c at the cylinder head 3 and an oil supply passage 61. The metal-made oil supply passage 61 extends downward from the oil take-out portion 3d, then bends rearward and to the left, and connects to the oil distributor 60. Thus, the number of the oil take-out portion 3d as the engine-side connection portion can be less than that of the oil supply passages of the first and second turbochargers 7, 8.

The first center housing 23 has a first supply passage 24 to guide the lubricating oil from the oil distributor 60, a first return passage 25 to exhaust the lubricating oil from the first center housing 23, and so on. The second center housing 33 has a second supply passage 34 to guide the lubricating oil from the oil distributor 60, a second return passage 35 to exhaust the lubricating oil, and so on. As shown in FIG. 1, the first and second return passages 25, 35 are located on the left side of the exhaust-gas purification device 12.

Figure 12:
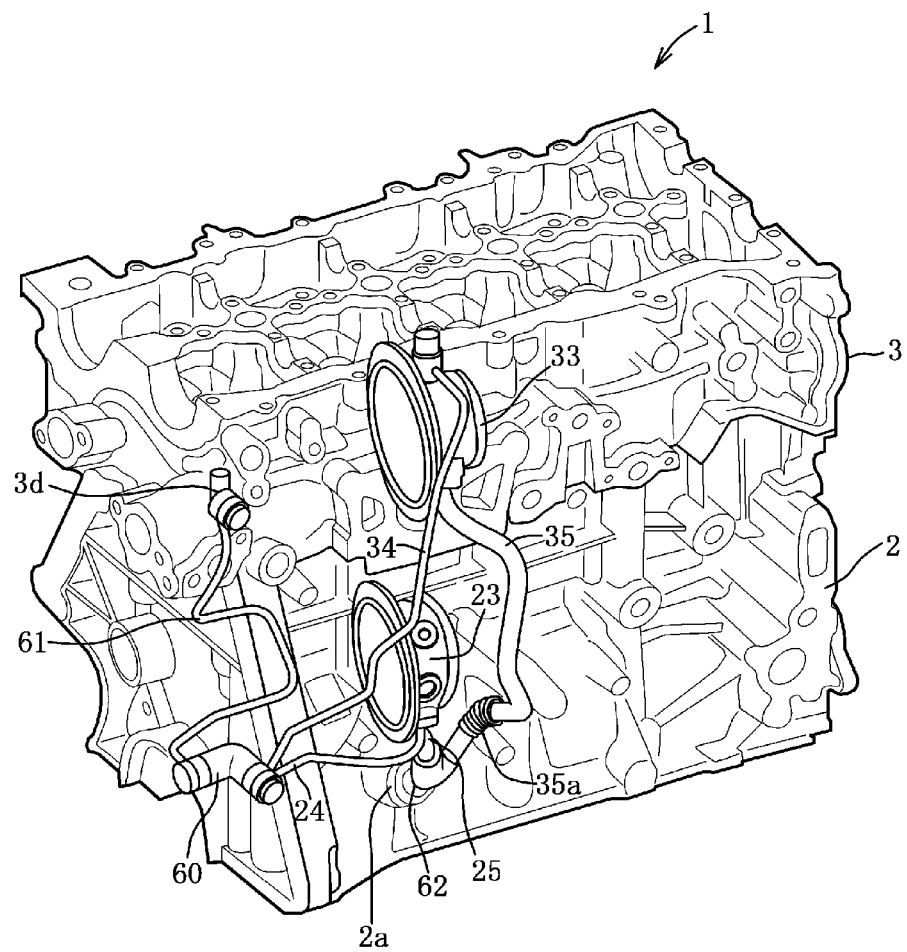
FIG. 12 is a perspective view showing a lubricating-oil passage according to the present embodiment.
Figure 13:
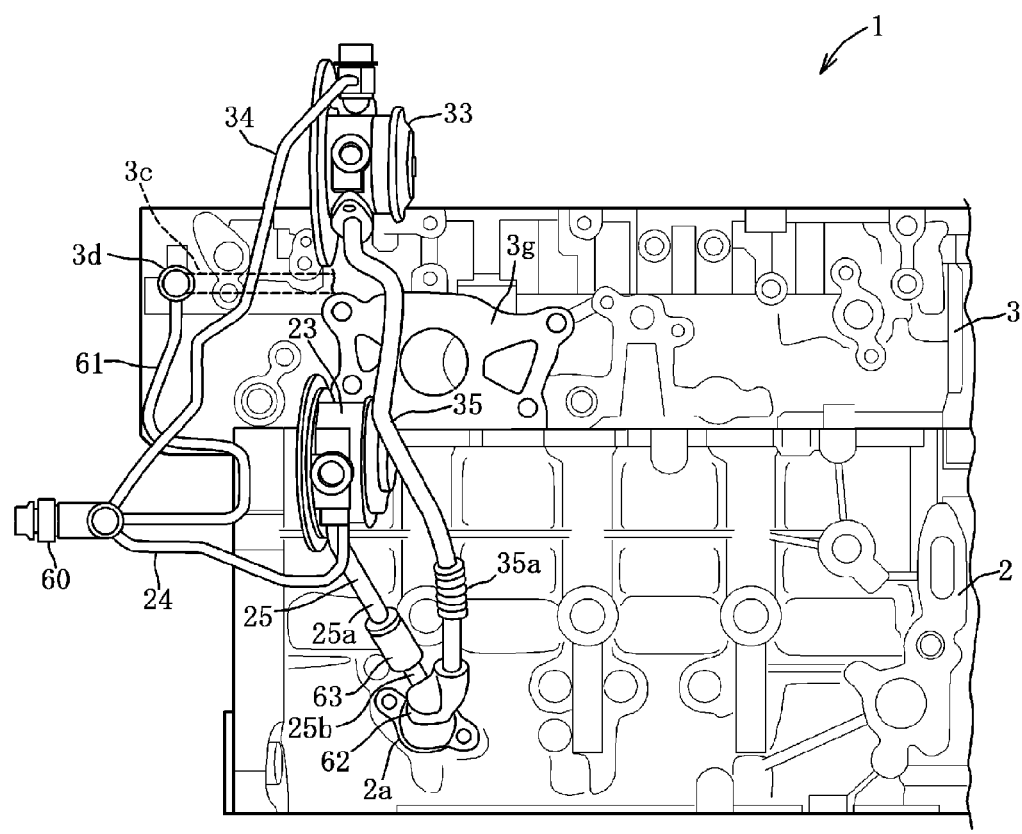
FIG. 13 is an elevational view showing the lubricating-oil passage according to the present embodiment.
Figure 14:
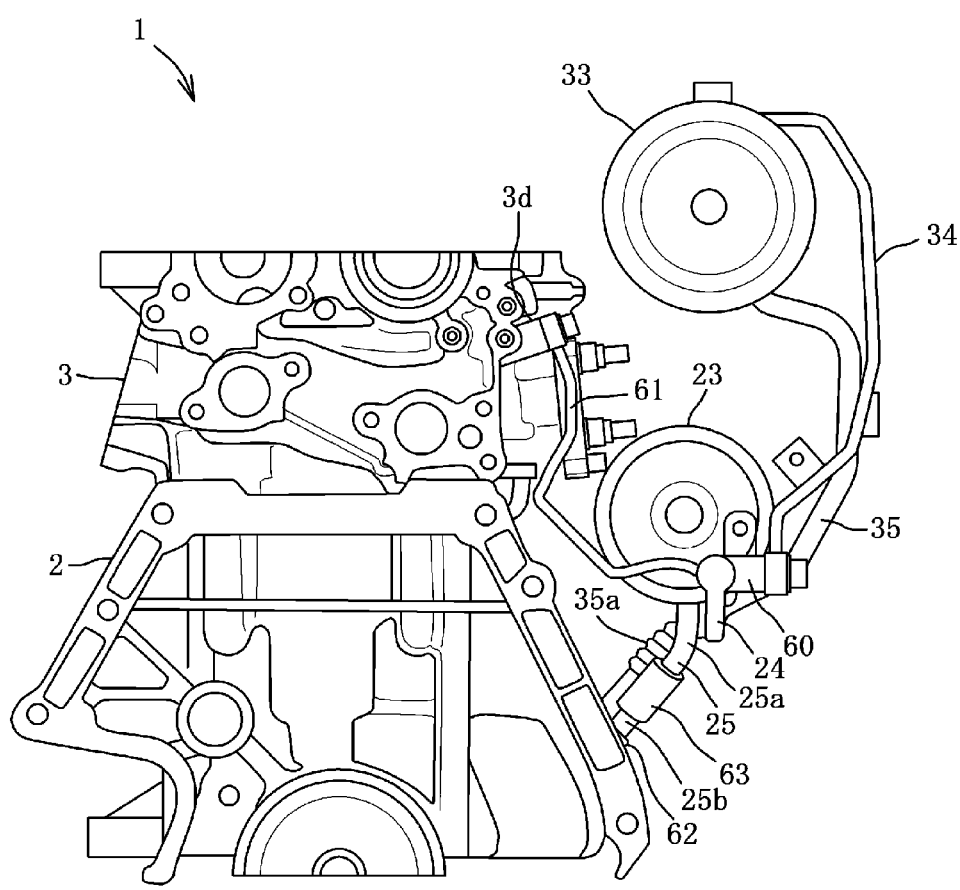
FIG. 14 is a left side view showing the lubricating-oil passage.
Figure 15:
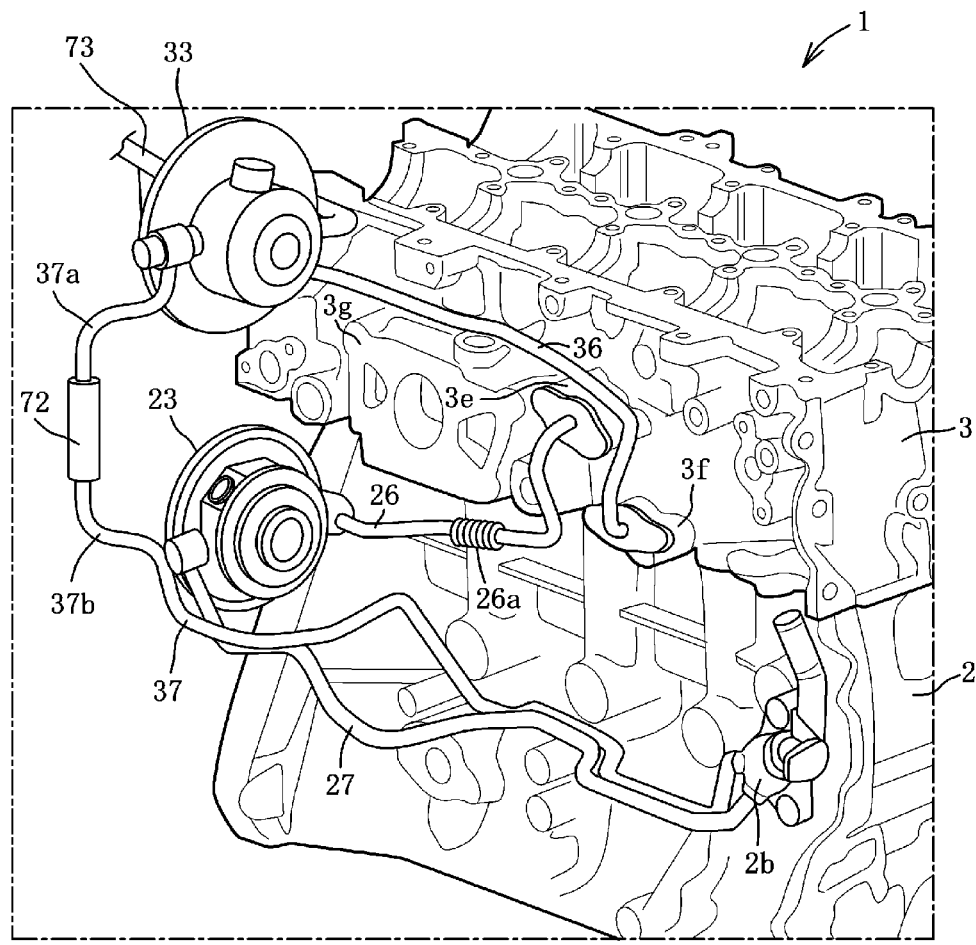
FIG. 15 is a perspective view showing a cooling-water passage according to the present embodiment.
Figure 16:
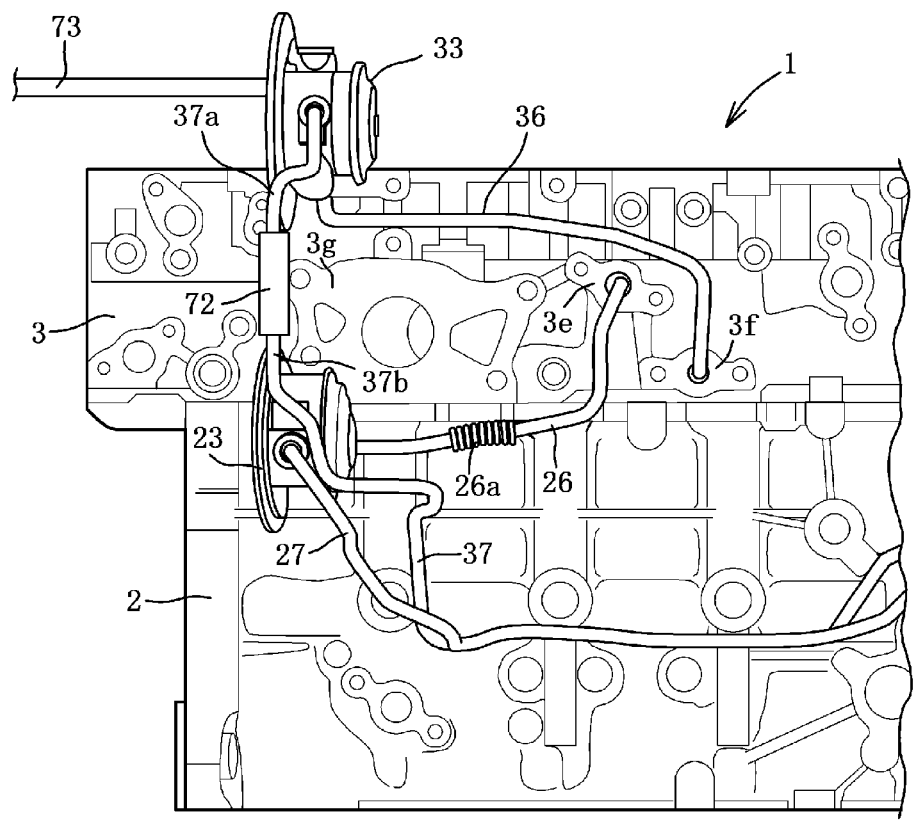
FIG. 16 is an elevational view showing the cooling-water passage.
Figure 17:
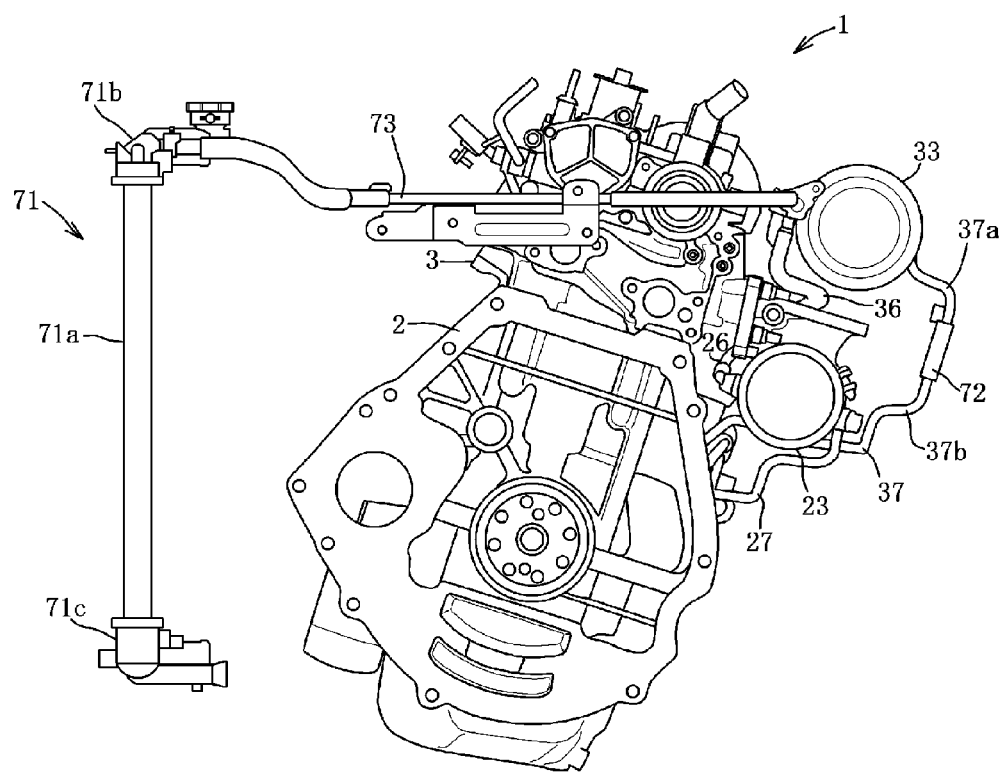
FIG. 17 is a left side view showing the cooling-water passage.

As shown in FIGS. 12 and 13, the metal-pipe-made first supply passage 24 extends from the oil distributor 60 to the right, toward the first turbocharger turbine shaft 7c, and bends upward, then connects to a lower face of the first center housing 23. The metal-pipe-made first return passage 25 has a larger diameter than the first supply passage 24, and comprises a first upstream return passage 25a on the side of the first center housing 23 and a first downstream return passage 25b on the side of the oil return portion 2a.

The first upstream return passage 25a connects to the lower face of the first center housing 23 at its upper end portion, and extends obliquely downward and forward. The first downstream return passage 25b joins the second return passage 35 at a junction 62 which will be described specifically. A lower end portion of the first upstream return passage 25a and an upper end portion of the first downstream return passage 25b are connected via a flexible hose 63 which is made from heat-resisting synthetic rubber. Accordingly, even if there occurs any positional error between the lower end portion of the first upstream return passage 25a and the upper end portion of the first downstream return passage 25b, the flexible hose 63 may absorb such positional error. Further, since the flexible hose 63 can be shortened by shortening of the first return passage 25, the surface area exposed to the high temperature can be minimized Accordingly, the vibration move of the first turbocharger 7 relative to the engine 1 can be absorbed, restraining the heat damage of the flexible hose 63, and the positional error of the first and second turbochargers 7, 8 can be absorbed.

The metal-pipe-made second supply passage 34 extends from the oil distributor 60 to the right, toward the second turbocharger turbine shaft 8c, and bends upward and then forward, then connects to an upper face of the second center housing 33. The metal-pipe-made second return passage 35 has a larger diameter than the second supply passage 34, and is arranged between the first return passage 25 and the exhaust-gas purification device 12. The second return passage 35 extends downward from the lower face of the second center housing 33, and then connects to the oil return portion 2a at its lower end portion. A bellows-shaped vibration absorption portion 35a is provided at a lower-side portion of the second return passage 35. Accordingly, even if the entire of the second return passage 35 is made from heat-resisting metal, the bellows-shaped vibration absorption portion 35a can absorb the vibration move which may be caused by difference in vibration characteristics between the second turbocharger and the engine.

The metal-made junction 62 where the first downstream return passage 25b joins is provided at the lower end portion of the second return passage 35, and connects to the oil return portion 2a at its lower end portion. The length of part of the second return passage 35 from the second center housing 33 to the junction 62 is longer than that of the first return passage 25 from the first center housing 23 to the junction 62. Herein, the passage length of the first return passage 25 is the total length of the passages of the first upstream return passage 25a, the first downstream passage 25b, and the flexible hose 63. Thereby, the number of the oil return portion 2a can be less than the number of the first and second return passages 25, 35 of the first and second turbochargers 7, 8. Accordingly, the first and second return passages 25, 35 can be connected to the engine's side wall by using a smaller layout space, thereby increasing the layout flexibility around the engine 1. Further, since only the second return passage 35 is connected to the engine's side wall, the positional error of the first turbocharger 7 relative to the engine 1 does not influence the connection of the second return passage 35, so that the assembly error of the second return passage 35 can be minimized.

Figure 18:
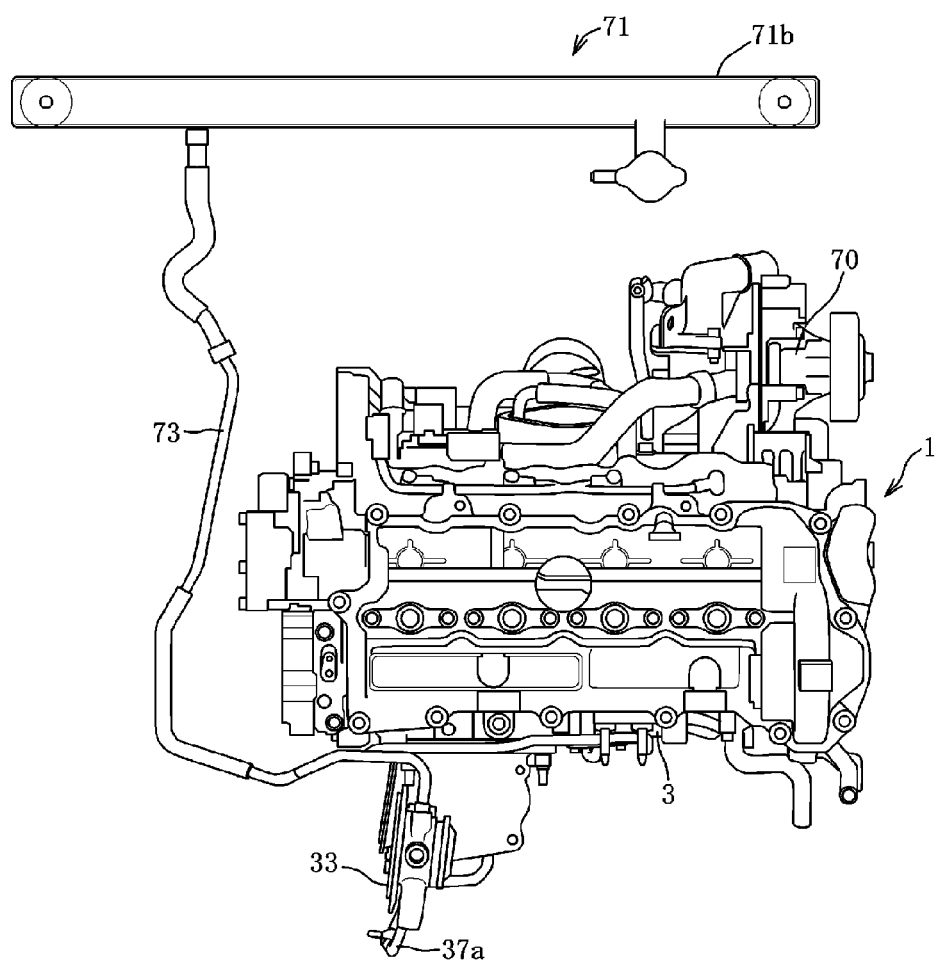
FIG. 18 is a plan view of the cooling-water passage, when viewed from above.

Next, a cooling device of the present embodiment will be described referring to FIGS. 15 through 18. As shown in FIG. 18, the cooling water of the engine 1 is supplied by a water pump 70 which is provided at a front side wall of the cylinder block 2 to potions to be cooled via cooling-water passages. The cooling water supplied from the water pump 70 to the cylinder head 3 via the cylinder block 2 circulates into water jackets (not illustrated) formed inside the cylinder head 3 and cools the portions to be cooled. The heated cooling water is supplied to a radiator 71 arranged at the front-side position of the engine 1, where the cooling water is cooled so as to decrease the water temperature through the heat exchanging with the vehicle's traveling air. The cooled water is returned to the water pump 70.

The radiator 71 comprises a core 71a having many heat-radiation fins, an upper tank 71b provided above the core 71a, a lower tank 71c provided below the core 71a, and so on. The cylinder head 3 and the upper tank 71b are connected by a suction passage (not illustrated), and the lower tank 71c and a cooling-water induction portion (not illustrated) on the suction side of the water pump 70 are connected via a delivery passage (not illustrated). The upper tank 71b is positioned above the second center housing 33 of the second turbocharger 8. A thermostat (not illustrated) to control the flow of the cooling water in accordance with the water temperature is provided at the cooling-water induction portion.

Inside the first center housing 23 of the first turbocharger 7 is formed a cooling-water reservoir (not illustrated) to reserve the cooling water at the bearing portion of the first turbocharger turbine shaft 7c. Similarly to the first center housing 23, another cooling-water reservoir (not illustrated) to reserve the cooling water at the bearing portion of the second turbocharger turbine shaft 8c is formed inside the second center housing 33 of the second turbocharger 8. The cooling water for the first and second turbocharger turbine shaft is supplied to the first and second center housings 23, 33 from the cylinder head 3, and then returned to a cooling-water return portion 2b which is formed at a middle right position of the rear side wall of the cylinder block 2. A heater return pipe is connected to the cooling-water return portion 2b, and the cooling-water for the first and second turbocharger turbine shaft joins the cooling water retuned from a heater (not illustrated). The cooling-water return portion 2b is connected to the cooling-water induction portion on the suction side of the water pump 70.

A first supply passage 26 to supply the cooling water from the cylinder head 3, a first return passage 27 to discharge the cooling water, and so on are provided at the first center housing 23. At the second center housing 33 are provided a second supply passage 36 to supply the cooling water from the cylinder head 3, a second return passage 37 to discharge the cooling water, a vapor return passage 73, and so on.

The metal-pipe-made first supply passage 26 couples a middle portion of a front face of the first center housing 23 which faces the rear side wall of the cylinder block 2 and a cooling-water connection portion 3e which connects to the water jacket of the cylinder head 3. The cooling-water connection portion 3e is provided at a central portion of the engine 1 in the crankshaft direction and at the middle position of the cylinder head 3. The first supply passage 26 extends downward from the cooling-water connection portion 3e, and then rearward toward the first center housing 23. A bellows-shaped vibration absorption portion 26a is provided at the first supply passage 26. Accordingly, when the engine 1 stops, the vapor generating at the first center housing 23 is exhausted to the water jacket of the cylinder head 3 via the first supply passage 26, so that the cooling water is newly supplied into the first center housing 23. The metal-pipe-made first return passage 27 couples a middle portion of a rear face of the first center housing 23 to the cooling-water return portion 2b. The first return passage 27 extends downward from the rear face of the first center housing 23 toward the cooling-water return portion 2b.

The metal-pipe-made second supply passage 36 couples a middle portion of a front face of the second center housing 33 which faces the rear side wall of the cylinder head cover 4 to a cooling-water connection portion 3f which connects to the water jacket of the cylinder head 3. The cooling-water connection portion 3f is provided on the right side of the cooling-water connection portion 3e and below the connection portion 3e. The second supply passage 36 extends upward from the cooling-water connection portion 3f, and then rearward toward the second center housing 33.

The metal-pipe-made second return passage 37 couples a middle portion of a rear face of the second center housing 33 to the cooling-water return portion 2b. The second return passage 37 comprises a second upstream return passage 37a on the side of the second center housing 33 and a second downstream return passage 37b on the side of the cooling-water return portion 2b. The second upstream return passage 37a connects to the middle portion of the rear face of the second center housing 23 at its upper end portion, and extends downward and rearward in a crank shape. The second downstream return passage 37b extends downward toward the cooling-water return portion 2b. A lower end portion of the second upstream return passage 37a and an upper end portion of the second downstream return passage 37b are connected via a flexible hose 72 which is made from heat-resisting synthetic resin and extends vertically.

The vapor return passage 73 couples an upper portion of the cooling-water reservoir of the second turbocharger turbine shaft 8c to a suction-side portion of the upper tank 71b. A connection position between the vapor return passage 73 and the second center housing 33 is located above a connection position between the second center housing 33 and the second supply passage 36 or a connection position between the second center housing 33 and the second return passage 37. Accordingly, when the engine 1 stops, the vapor generating at the second center housing 33 is discharged to the suction-side portion of the upper tank 71b via the vapor return passage 73, so that the cooling water is newly supplied into the second center housing 33 via the second supply passage 36.

Hereafter, the operation and effect of the lubrication device of the turbocharger of the engine 1 for a vehicle according to the present embodiment will be described. In the present lubrication device of the turbocharger of the engine 1 for a vehicle, in which the first turbocharger 7 and the second turbocharger 8 are provided at the rear side wall of the engine 1, the second turbocharger 8 being located above the level of the first turbocharger 7, the first turbocharger 7 comprises the first center housing 23 to which the lubricating oil is supplied from the engine 1 and the first return passage 25 through which the lubricating oil from the first center housing 23 is returned to the oil return portion 2a of the engine 1, the second turbocharger 8 comprises the second center housing 33 to which the lubricating oil is supplied from the engine 1 and the second return passage 35 through which the lubricating oil from the second center housing 33 is returned to the oil return portion 2a of the engine 1, the first return passage 25 joins the second return passage 35 at the junction 62, the length of the second return passage 35 from the second center housing 33 to the junction 62 is longer than that of the first return passage 25 from the first center housing 23 to the junction 62, the bellows-shaped vibration absorption portion 35a is provided at the second return passage 35, and the first return passage 25 comprises the first upstream return passage 25a and the first downstream return passage 25b, and the first upstream and downstream return passages 25a, 25b are connected to each other via the flexible hose 63.

According to the present lubrication device of the turbocharger of the engine 1 for a vehicle, the number of the oil return portion 2a as the engine-side connection portion can be less than that of the return passages of the first and second turbochargers 7, 8. Thereby, the first and second return passages 25, 35 can be connected to the rear side wall of the engine 1 compactly by using the smaller layout space, so that the layout flexibility around the engine 1 can be increased. Further, since only the second return passage 35 is connected to the rear side wall of the engine 1, the positional error of the first turbocharger 7 relative to the engine 1 does not influence the connection of the second return passage 35, so that the assembly error of the second return passage 35 can be minimized Further, eve if the second return passage 35 is made from metal having the high heat resistance, the vibration move between the second turbocharger 8 and the engine 1 can be properly absorbed by the bellows-shaped vibration absorption portion 35a. Moreover, since the flexible hose 63 of the first turbocharger 7 can be shorter, the surface area exposed to the high temperature can be minimized Accordingly, the vibration move between the first turbocharger 7 and the engine 1 can be absorbed, preventing the heat damage of the flexible hose 63, so that the positional error between the first and second turbochargers 7, 8 can be absorbed properly.

The turbine shaft 7c of the first turbocharger 7 and the turbine shaft of the second turbocharger 8 are arranged substantially in parallel to each other, the exhaust-gas purification device 12 is arranged on the right side in the axial direction of the turbine shafts 7c, 8c, the first and second return passages 25, 35 are arranged on the left side in the axial direction of the turbine shafts 7c, 8c relative to the exhaust-gas purification device 12, and the first return passage 25 is arranged on the left side in the axial direction of the turbine shafts 7c, 8c relative to the second return passage 35. Thereby, since the metal-made second return passage 35 is provided between the exhaust-gas purification device 12 and the flexible hose 63 and the distance between the exhaust-gas purification device 12 and the flexible hose 63 can be greater, the heat damage of the flexible hose 63 by the exhaust-gas purification device 12 can be restrained, so that the appropriate oil return of the first and second turbochargers 7, 8 can be secured.

Even if the DPF which tends to generate heat greatly is provided as the exhaust-gas purification device 12, the heat damage of the flexible hose 63 can be restrained, so that the appropriate oil return of the first and second turbochargers 7, 8 can be secured. Since the first turbocharger 7 is the one operating at the low engine-speed, and the second turbocharger 8 is the one operating at the middle and high engine-speed, the vibration move of the second turbocharger 8 having the higher turbine speed can be absorbed by the long metal-made second return passage 35 of the second turbocharger 8 which is equipped with the bellows-shaped vibration absorption portion 35a, so that the reliability of the second return passage 35 can be secured.

The lubricating oil supplied from the engine 1 is supplied to the oil distributer 60 from the oil gallery 3c of the cylinder head 3, and then to the first and second center housings 23, 33. Thereby, since the number of the oil take-out portion 3d as the engine-side connection portion can be less than that of the first and second supply passages 24, 34, the first and second supply passages 24, 34 can be connected to the rear side wall of the cylinder head 3 compactly by using a smaller layout space, so that the layout flexibility around the engine 1 can be increased.

Next, modifications of the above-described embodiment will be described.

While the example of the laterally-disposed diesel engine is described in the above-described embodiment, the present invention is applicable to any kind of engine or any disposition type of engine, for example, a reciprocating engine which is disposed longitudinally.

Further, while the above-described embodiment describes the turbocharger system comprising the lower small-volume first turbocharger and the upper large-volume second turbocharger which are arranged vertically, the present invention is applicable to a turbocharger system in which the small-volume first turbocharger is arranged upward and the large-volume second turbocharger is arranged downward.

Moreover, while the above-described embodiment describes the example in which the radiation of the heat energy can be restrained with the shortened passage between the turbines, the liability of the first and second return passages can be improved by using any other temperature increase technologies with a valve driving system, such as the exhaust-valve lift control during the intake-valve lifting, that is, a so-called dual-valve opening control.

As described above, the present invention should not be limited to the above-described embodiment, and any other modifications and improvements may be applied within the scope of a sprit of the present invention.

What is claimed is:

1. A lubrication device of a turbocharger of an engine for a vehicle, in which a first turbocharger and a second turbocharger are provided at a one-side wall of the engine, the second turbocharger being located above the level of the first turbocharger, wherein:
   the first turbocharger comprises a shaft bearing portion to which lubricating oil is supplied from the engine and a metal-made return passage through which the lubricating oil from the shaft bearing portion is returned to an return portion of the engine;
   the second turbocharger comprises a shaft bearing portion to which lubricating oil is supplied from the engine and a metal-made return passage through which the lubricating oil from the shaft bearing portion is returned to the return portion of the engine; and
   a bellows-shaped vibration absorption portion is provided at the metal-made return passage of the second turbocharger;
   wherein the metal-made return passage of the first turbocharger joins the return passage of the second turbocharger at a junction;
   wherein the length of the metal-made return passage of the second turbocharger from the shaft bearing portion to said junction is longer than that of the metal-made return passage of the first turbocharger from the shaft bearing portion to said junction; and
   wherein the metal-made return passage of the first turbocharger comprises an upstream metal-made return passage and a downstream metal-made return passage, and the upstream and downstream metal-made return passages are connected to each other via a flexible hose.

2. The lubrication device of a turbocharger of an engine for a vehicle of claim 1, wherein a turbine shaft of the first turbocharger and a turbine shaft of the second turbocharger are arranged substantially in parallel to each other, an exhaust-gas purification device is arranged on the side of one end of the turbine shaft, both the return passages of the first and second turbochargers are arranged on the side of the other end of the turbine shaft relative to the exhaust-gas purification device in an axial direction of the turbine shaft, and the metal-made return passage of the first turbocharger is arranged on the side of the other end of the turbine shaft relative to the metal-made return passage of the second turbocharger in the axial direction of the turbine shaft.

3. The lubrication device of a turbocharger of an engine for a vehicle of claim 2, wherein said exhaust-gas purification device is a diesel particulate filter.

4. The lubrication device of a turbocharger of an engine for a vehicle of claim 3, wherein said first turbocharger is a turbocharger to operate at a low engine-speed, and said second turbocharger is a turbocharger which operates at a middle and high engine-speed.

5. The lubrication device of a turbocharger of an engine for a vehicle of claim 3, wherein the lubricating oil supplied from the engine is supplied to an oil distributer from an oil gallery of a cylinder head, and then to the shaft bearing portions of the first and second turbochargers.

6. The lubrication device of a turbocharger of an engine for a vehicle of claim 2, wherein said first turbocharger is a turbocharger to operate at a low engine-speed, and said second turbocharger is a turbocharger which operates at a middle and high engine-speed.

7. The lubrication device of a turbocharger of an engine for a vehicle of claim 2, wherein the lubricating oil supplied from the engine is supplied to an oil distributer from an oil gallery of a cylinder head, and then to the shaft bearing portions of the first and second turbochargers.

8. The lubrication device of a turbocharger of an engine for a vehicle of claim 1, wherein said first turbocharger is a turbocharger to operate at a low engine-speed, and said second turbocharger is a turbocharger which operates at a middle and high engine-speed.

9. The lubrication device of a turbocharger of an engine for a vehicle of claim 8, wherein the lubricating oil supplied from the engine is supplied to an oil distributer from an oil gallery of a cylinder head, and then to the shaft bearing portions of the first and second turbochargers.

10. The lubrication device of a turbocharger of an engine for a vehicle of claim 1, wherein the lubricating oil supplied from the engine is supplied to an oil distributer from an oil gallery of a cylinder head, and then to the shaft bearing portions of the first and second turbochargers.

* * * * *